United States Patent
Kawamura et al.

(10) Patent No.: US 8,055,658 B2
(45) Date of Patent: Nov. 8, 2011

(54) DATA CREATING APPARATUS AND DATA CREATING METHOD

(75) Inventors: Takahiro Kawamura, Tokyo (JP); Tomohiro Yamasaki, Tokyo (JP); Shinichi Nagano, Kanagawa (JP); Yumiko Shimogori, Kanagawa (JP); Takayuki Iida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 403 days.

(21) Appl. No.: 12/419,777

(22) Filed: Apr. 7, 2009

(65) Prior Publication Data

US 2009/0259655 A1 Oct. 15, 2009

(30) Foreign Application Priority Data

Apr. 10, 2008 (JP) ................................. 2008-102444

(51) Int. Cl.
*G06F 17/30* (2006.01)

(52) U.S. Cl. ............ 707/736; 707/737; 707/738; 704/1; 704/9

(58) Field of Classification Search .................. 704/9, 1; 717/140, 143, 136; 707/736, 737, 738
See application file for complete search history.

(56) References Cited

U.S. PATENT DOCUMENTS

| 5,594,837 | A  | * | 1/1997  | Noyes ............................... 706/55   |
| 6,446,035 | B1 | * | 9/2002  | Grefenstette et al. ............ 704/1         |
| 7,171,352 | B2 | * | 1/2007  | Chang et al. ....................... 704/9      |
| 7,681,186 | B2 | * | 3/2010  | Chang et al. .................... 717/143       |
| 7,689,410 | B2 | * | 3/2010  | Chang et al. ....................... 704/9      |
| 7,761,858 | B2 | * | 7/2010  | Chang et al. .................... 717/140       |
| 2005/0005266 | A1 | * | 1/2005 | Datig ............................ 717/136      |
| 2005/0251382 | A1 | * | 11/2005 | Chang et al. ....................... 704/9     |
| 2005/0273335 | A1 | * | 12/2005 | Chang et al. .................... 704/257      |
| 2005/0273336 | A1 | * | 12/2005 | Chang et al. .................... 704/257      |
| 2005/0289522 | A1 | * | 12/2005 | Chang et al. .................... 717/140      |
| 2009/0259655 | A1 | * | 10/2009 | Kawamura et al. ............... 707/5          |

FOREIGN PATENT DOCUMENTS

| JP | 2005-071026 | 3/2005 |
| JP | 2007-241753 | 9/2007 |

* cited by examiner

*Primary Examiner* — Jean M Corrielus
(74) *Attorney, Agent, or Firm* — Turocy & Watson, LLP

(57) ABSTRACT

A data creating apparatus extracts meta data about a topic from a document, the meta data including at least one linguistic expression about a behavior, a plurality of the linguistic expressions having a first modification relation. The data creating apparatus converts the linguistic expressions included in the behavioral meta data into each class, based on a behavior ontology that is expressed by a graph where the linguistic expression about a behavior is an instance and a concept of the instance is a class to create behavior map data that represents each of the classes converted and also representing a second modification relation among the classes as a link.

10 Claims, 7 Drawing Sheets

DATA CREATING APPARATUS AND DATA CREATING METHOD

CROSS-REFERENCE TO RELATED APPLICATIONS

This application is based upon and claims the benefit of priority from the prior Japanese Patent Application No. 2008-102444, filed on Apr. 10, 2008; the entire contents of which are incorporated herein by reference.

BACKGROUND OF THE INVENTION

1. Field of the Invention

The present invention relates to a data creating apparatus and a data creating method that extract a record of a user behavior from a document accessible via a network and create behavior map data for presenting a relevant behavior based on the record.

2. Description of the Related Art

Conventionally, for example, as a part of the "Information Grand Voyage Project", a life log system such as "My Life Assist Service" has been studied (for example, see JP-A 2005-71026 (KOKAI)). In this study, mobile telephones, radio frequency identification devices (RFIDs), and other various sensors are utilized to attempt to find some regularity from a user behavior record. Based on the found regularity, user's current behavior (context) or a behavior relevant to contents of a webpage or a moving image that the user is currently browsing (relevant behavior) are presented as a recommended behavior.

However, when the relevant behavior is presented based solely on the record of user's individual behavior, as in technique in JP-A 2005-71026 (KOKAI), it is probable that the behavior is too predictable for the user. Further, when using a record of other people's records to present the relevant behavior, there can be a problem in view of security and privacy concerns.

SUMMARY OF THE INVENTION

According to one aspect of the present invention, a data creating apparatus includes an extracting unit that extracts behavioral meta data about a topic from a document, the behavioral meta data including at least one linguistic expression about a behavior, a plurality of the linguistic expressions having a first modification relation; a converting unit that converts each of the linguistic expressions into each of classes, based on a behavior ontology that is expressed by a graph where the linguistic expression about the behavior is set as an instance and a concept of the instance is set as the class; and a data creating unit that creates behavior map data representing each of the classes converted by the converting unit and also representing a second modification relation among the classes as a link.

According to another aspect of the present invention, a relevant-behavior information output apparatus, includes a storage unit that stores behavior map data, which represents classes corresponding to a concept of a linguistic expression about a plurality of behaviors and a modification relation among the classes as a link; an acquiring unit that acquires topic information indicating a target topic and behavior information indicating a current user behavior; a searching unit that searches the behavior map data corresponding to a topic indicated by the topic information in the storage unit and obtains relevant behavior map data; a selecting unit that selects a relevant behavior relevant to the behavior, based on the link for a first class equivalent to a concept of the behavior indicated by the behavior information, in the behavior map data obtained as a result of the search; and an output unit that outputs relevant behavior information indicating the relevant behavior.

According to still another aspect of the present invention, a data creating method implemented in a data creating apparatus, the method includes extracting behavioral meta data about a topic from a document, the behavioral meta data including at least one linguistic expression about a behavior, a plurality of the linguistic expressions having a first modification relation; converting each of the linguistic expressions into each of classes, based on a behavior ontology that is expressed by a graph where the linguistic expression about the behavior is set as an instance and a concept of the instance is set as the class, based on a behavior ontology that is expressed by a graph where the linguistic expression about a behavior is set as an instance and a concept of the instance is set as a class; and creating behavior map data representing each of the converted classes and also representing a second modification relation among the classes as a link.

According to still another aspect of the present invention, a relevant-behavior information output method implemented in a relevant-behavior information output apparatus including a storage unit that stores behavior map data, which represents classes corresponding to a concept of a linguistic expression about a plurality of behaviors and a modification relation among the classes as a link, the method includes acquiring topic information indicating a target topic and behavior information indicating a current user behavior; searching the behavior map data corresponding to a topic indicated by the topic information in the storage unit and obtaining relevant behavior map data; selecting a relevant behavior relevant to the behavior, based on the link for a first class equivalent to a concept of the behavior indicated by the behavior information, in the behavior map data obtained as a result of the search; and outputting relevant behavior information indicating the relevant behavior.

DETAILED DESCRIPTION OF THE INVENTION

Exemplary embodiments of a data creating apparatus and a data creating method according to the present invention will be explained below in detail with reference to the accompanying drawings.

A data creating apparatus 100 according to an embodiment includes a control device such as a central processing unit (CPU) that controls an entire apparatus, a storage device such as a read only memory (ROM) and a random access memory (RAM) that stores various data and various programs, an external storage device such as a hard disk drive (HDD) and a compact disk (CD) drive device that stores various data and various programs, and a bus that connects these components. The data creating apparatus 100 has a hardware configuration using a normal computer. The data creating apparatus 100 is connected with a display that displays information, an input device such as a key board and a mouse that accepts user instruction input, and a communication interface (I/F) that controls a communication of the external device, in wired or wireless communication.

Figure 1:
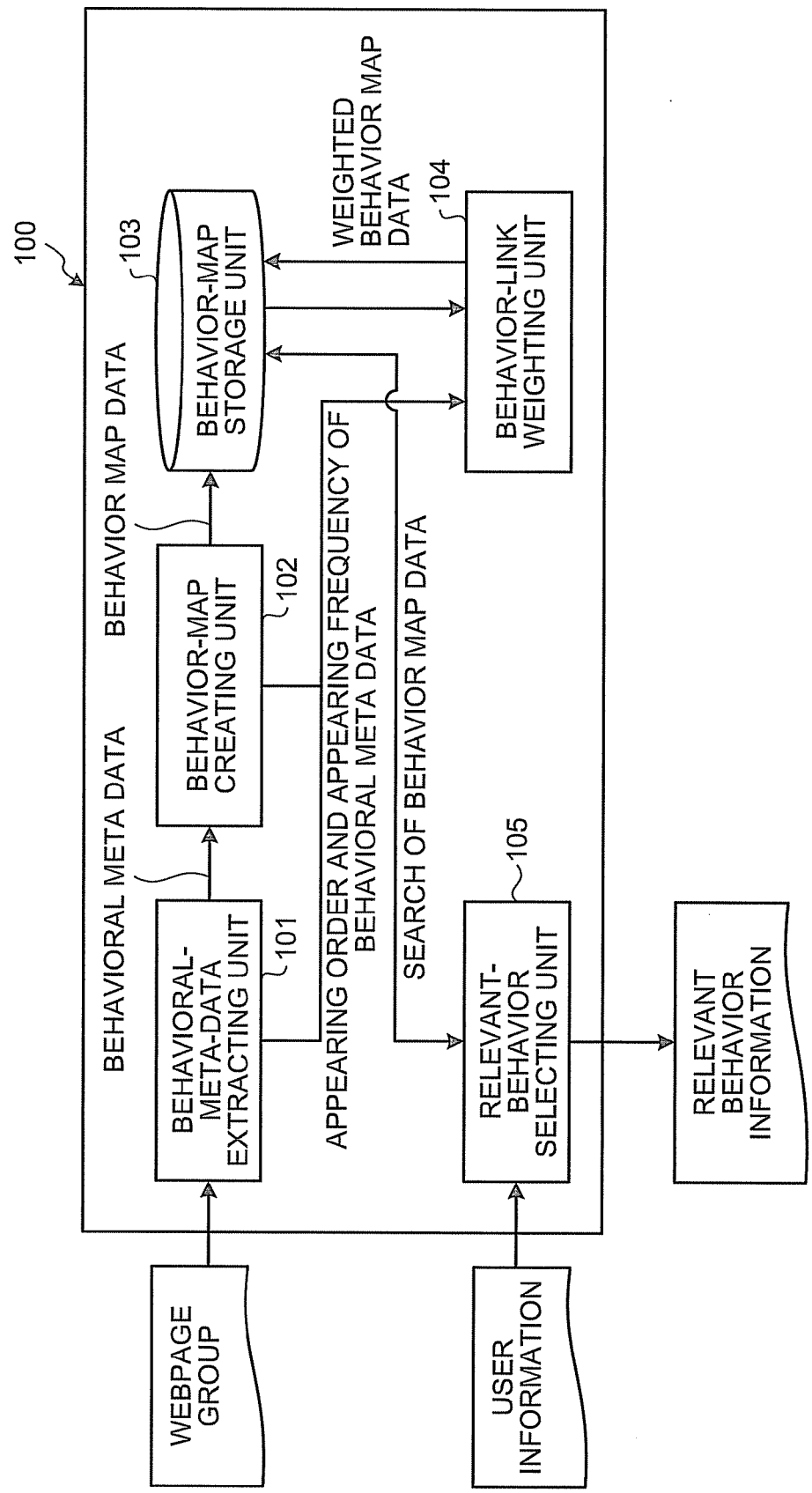
FIG. 1 is a diagram of an example of a functional configuration of a data creating apparatus according to an embodiment of the present invention.

Next, in such a hardware configuration, various functions realized in the data creating apparatus 100 as a result of the CPU executing the various programs stored in the storage device or the external storage device are explained below. The various programs stored in the storage device or the external storage device include not only a program code but also various data used when the program code is executed. FIG. 1 is a diagram of an example of a functional configuration of the data creating apparatus 100. The data creating apparatus 100 includes a behavioral-meta-data extracting unit 101, a behavior-map creating unit 102, a behavior-map storage unit 103, a behavior-link weighting unit 104, and a relevant-behavior selecting unit 105. Among these units, the behavioral-meta-data extracting unit 101, the behavior-map creating unit 102, the behavior-link weighting unit 104, and the relevant-behavior selecting unit 105 are generated on the storage device such as a RAM at the time of executing a CPU program. The behavior-map storage unit 103 is stored in the external storage device, for example. Although not shown, in the external storage device, a behavior ontology and a product ontology described later are stored.

To the behavioral-meta-data extracting unit 101, a plurality of webpages, regarding a certain topic, collected as documents accessible via a network are inputted. The webpage that is to be collected is a consumer generated media (CGM) such as a blog and an SNS. Examples of network include a local area network (LAN), intranet, Ethernet (registered trademark), and the Internet. Examples of topic include a product name, a person name, and a subject to talk about. Collecting of the webpage regarding a topic is performed by a keyword-based search engine that searches using a topic as a keyword, for example. More specifically, regarding a topic of "Harry", for example, a webpage including this word as the keyword is collected by the keyword-based search engine. When the webpage thus collected is inputted to the behavioral-meta-data extracting unit 101, the behavioral-meta-data extracting unit 101 extracts behavioral meta data from the webpage. More specifically, the behavioral-meta-data extracting unit 101 extracts, as the behavioral meta data, a linguistic expression about a behavior or a list containing two or more linguistic expressions that include the linguistic expression and have a modification relation. The linguistic expression used herein is a term, and is at least one of a subject, an object, a complement, and a predicate. The term about the behavior is "see", "rent", "purchase" and the like, and mainly corresponds to the predicate. For example, when there is a sentence on a webpage "I just noticed that Harry's DVD was on sale today, so I went to a AB store and rented it after work", there is established a modification relation among the subject, the object, the complement, and the predicate in each term of "Harry", "DVD", "AB store", and "rented". Accordingly, the behavioral-meta-data extracting unit 101 extracts the behavioral meta data of "Harry, DVD, AB store, and rented" from the webpage. Basically, the behavioral meta data is extracted in a unit of sentence, and it suffices as long as at least the predicate is included as the term about the behavior.

The behavior-map creating unit 102 refers to the behavior ontology and the product ontology described later to convert each term included in each behavioral meta data extracted by the behavioral-meta-data extracting unit 101 into each class so that each class is represented as a node and also to create behavior map data representing a modification relation among the classes as a node-to-node link for each topic.

Figure 2:
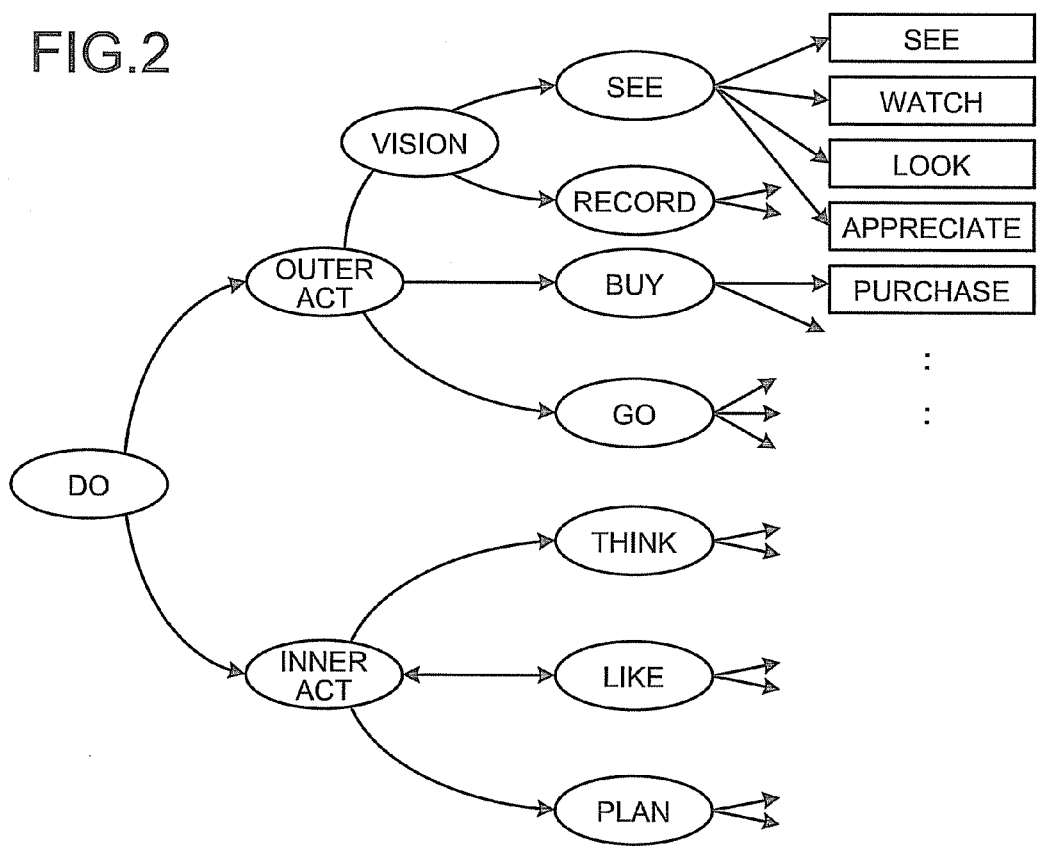
FIG. 2 is a diagram of an example of a data configuration of a behavior ontology according to the embodiment.

FIG. 2 is a diagram of an example of a data configuration of the behavior ontology. The behavior ontology is expressed by a graph where a behavioral expression is an instance and a concept of this instance is a class. In FIG. 2, there are two classes of "outer act" and "inner act" for a class of "do", and further, the two classes have respective classes. For example, for "outer act", there are respective classes such as "vision", "buy", and "go", and further, for "vision", there are respective classes such as "see" and "record". For "inner act", there are respective classes of "think", "like", "plan" and the like. Examples of class-to-class relation include a hierarchical relation, an anteroposterior relation, a parallel relation, a one-to-one relation, and a one-to-many relation. However, the relation type is not limited in this case. In each class of "see", "buy", "go", "think", "like", and "plan", an instance or each behavioral expression converged to its concept exists. For example, in the class of "see", there are instances such as "watch", "look" and "appreciate". That is, a variation resulting from a specific behavioral expression converged to the concept of "see" exists as the instance.

Figure 3:
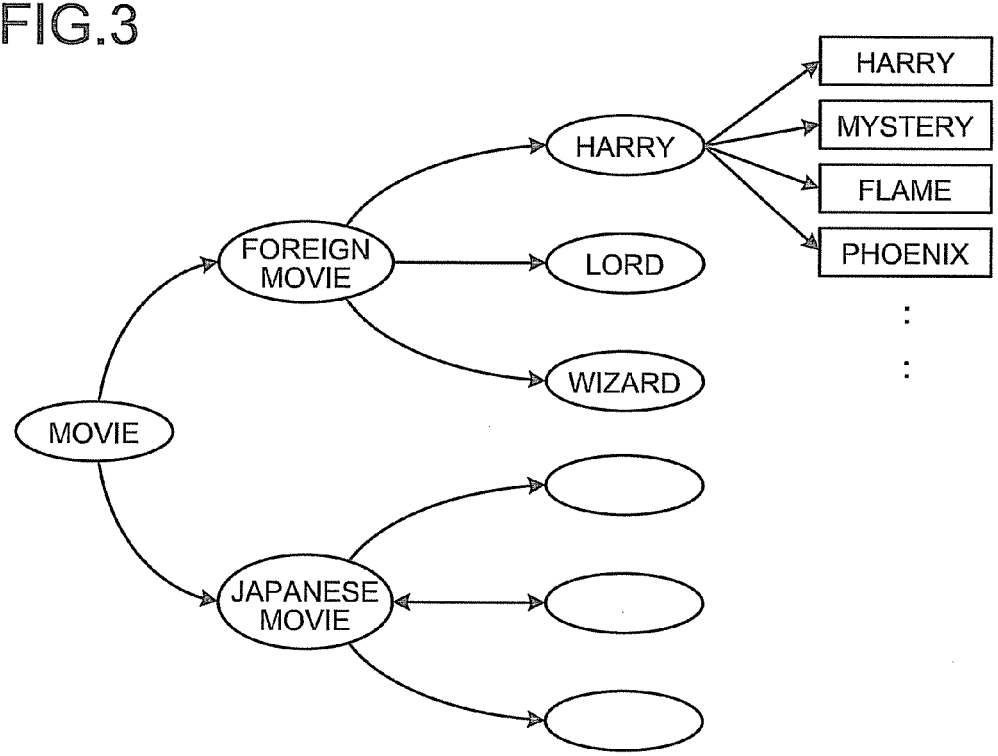
FIG. 3 is a diagram of an example of a data configuration of a product ontology according to the embodiment.

FIG. 3 is a diagram of an example of a data configuration of the product ontology. The product ontology is expressed by a graph where a product name, a detail of product names, an item name are instances, and a concept of the instance is a class. In FIG. 3, a product ontology about a movie, for example, is shown. For a class of "movie", there are two classes of a "foreign movie" and a "Japanese movie". For the class of "foreign movie", there are respective classes such as "Harry", "Lord", and "Wizard" as a movie name. For example, for the class of "Harry", there are instances such as "Harry", "mystery", "flame", and "phoenix", which are details of the movie.

Figure 4:
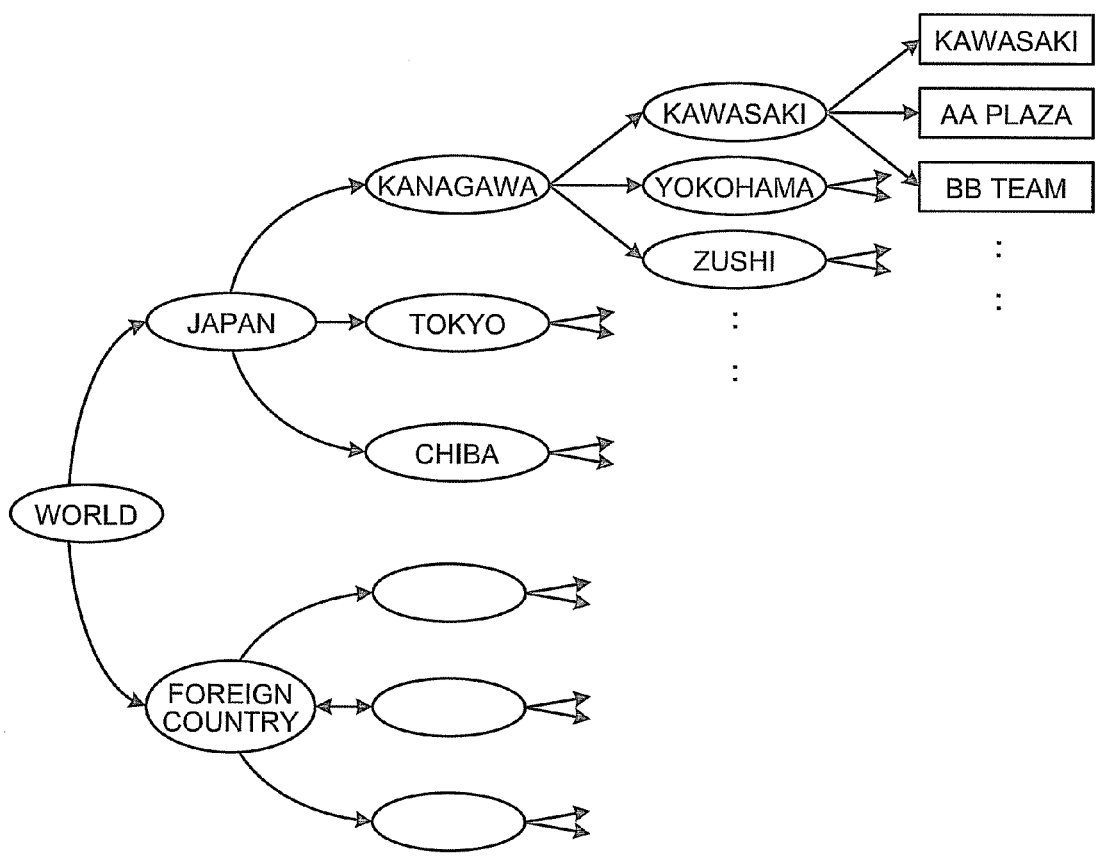
FIG. 4 is a diagram of an example of a data configuration of a geographic name ontology according to the embodiment.

Besides, a geographic name ontology is stored in the external storage device, and this can be used therefor. The geographic name ontology is expressed by a graph where a regional name or a place name is an instance and a geographic name where the former exists is a class. FIG. 4 depicts a data configuration of the geographic name ontology. In FIG. 4, for a class of "world", there are two classes of a "foreign country" and "Japan". For the class of "Japan", there are respective classes such as "Kanagawa", "Tokyo", and "Chiba". Further, for the class of "Kanagawa", there are respective classes such as "Kawasaki", "Yokohama", and "Zushi". For the class of "Kawasaki", there are instances such as "Kawasaki", "AA plaza", and "BB team".

In each ontology, whether the concepts of each class are approximated, that is, whether the concepts of each class have a closer meaning", is set in advance. Each class is plotted in the graph in a manner that the closer the meaning, the closer the each class.

The behavior-map creating unit 102 refers at least to the behavior ontology and the product ontology thus described to convert each term included in each behavioral meta data into each class. For example, the behavior-map creating unit 102 converts each term included in the behavioral meta data of "Harry, DVD, AB store, and rented" in each class of "Harry", "DVD", "rental store", and "see" in the order from the left. The behavior-map creating unit 102 creates the behavior map data that represents each of these classes as a node, and also, representing, as a node-to-node link, a modification relation among classes, i.e., "DVD" and "rental store" are connected and "DVD" and "rental store" are connected to "Harry", and "rent" is connected to "DVD" and "rental store".

Figure 5:
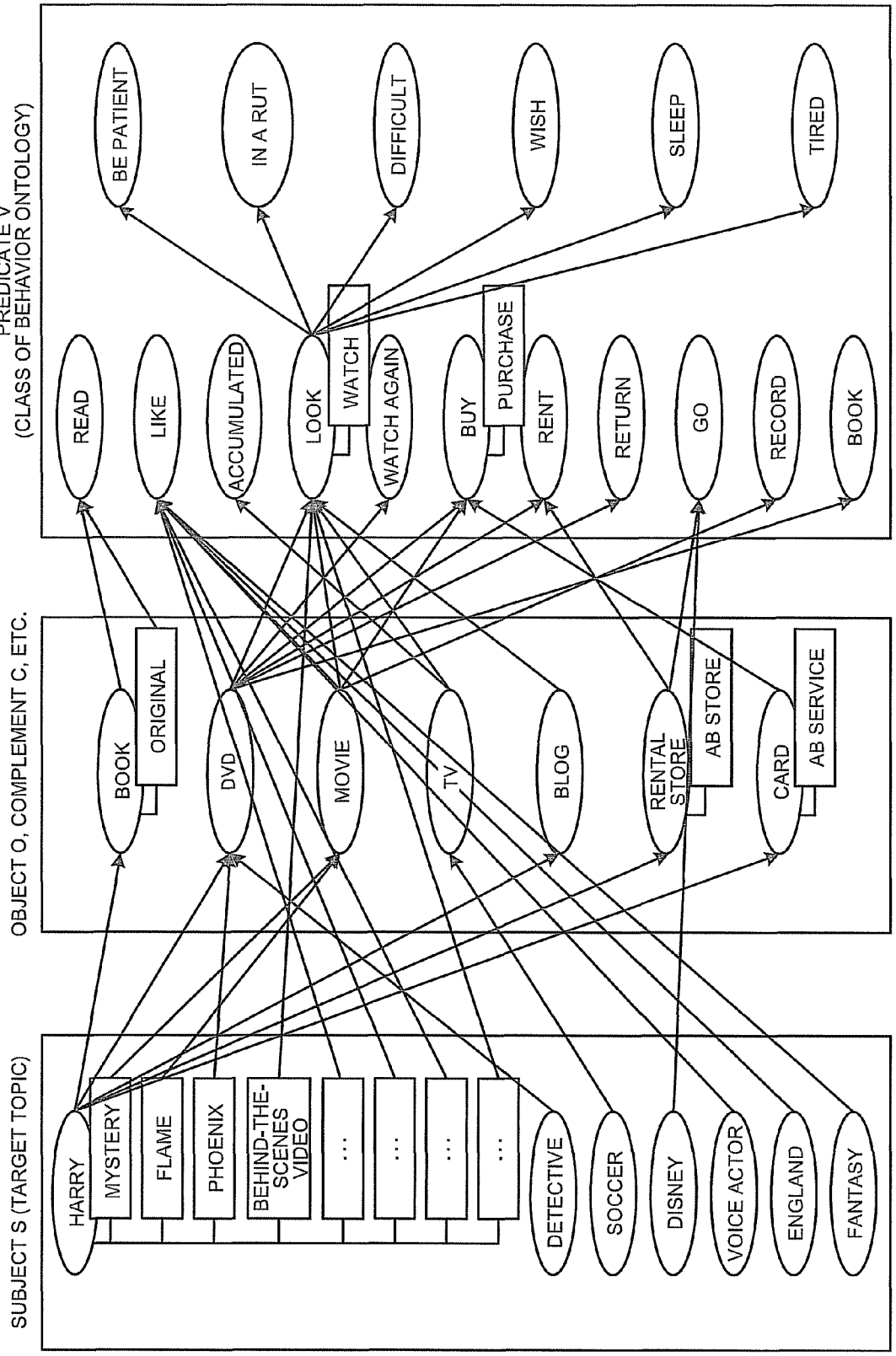
FIG. 5 is a conceptual diagram of a data configuration of behavior map data according to the embodiment.

FIG. 5 is a conceptual diagram of a data configuration of the behavior map data. The behavior map data shown in FIG. 5 relates to the topic "Harry". In FIG. 5, as the subject, the object, and the complement, each class existing in the product ontology is represented as a node. As the predicate, each class existing in the behavior ontology is represented by the linguistic expression. The modification relation among the classes is represented by arrows as the node-to-node links. The node-to-node links are a hierarchical relation, an anteroposterior relation, a parallel relation, a one-to-one relation, and a one-to-many relation. However, the relation type is not limited in this case.

The behavior-link weighting unit 104 sets a weighting coefficient to a link based on the number of appearances of the modification relation among the classes, with respect to the behavior map data created by the behavior-map creating unit 102. For example, provided that there are the following four behavioral meta data:
Behavioral meta data 1 "Harry, DVD, rented";
Behavioral meta data 2 "Mr. Harry, DVD, viewed";
Behavioral meta data 3 "Lord, DVD, appreciated"; and
Behavioral meta data 4 "Lord, DVD, recorded".
Each term included in these is converted in each class as described below, for example.
Behavioral meta data 1 "Harry, DVD, rented";
Behavioral meta data 2 "Harry, DVD, see";
Behavioral meta data 3 "Lord, DVD, see"; and
Behavioral meta data 4 "Lord, DVD, record".
In this case, from the number of times of appearances of the modification relation among classes with respect to each class converted from each term, the behavior-link weighting unit 104 doubles the weighting coefficients of a link between "Harry" and "DVD" and a link between "DVD" and "see". Values of the weighting coefficients are relevant to the links and stored in the behavior map data.

The behavior-link weighting unit 104 sets the weighting coefficient for the link based on the appearing order of the behavioral meta data. The appearing order of the behavioral meta data means the writing order of the original sentence with respect to a plurality of behavioral meta data extracted from a sentence written within the same webpage. For example, when the behavioral meta data 1 and the behavioral meta data 2 are extracted from a sentence in which the behavioral meta data 1 and the behavioral meta data 2 are written in this order within the same webpage, from this order, the behavior-link weighting unit 104 multiplies each of the weighting coefficient of the node-to-node link based on the behavioral meta data 1 and the weighting coefficient of the node-to-node link based on the behavioral meta data 2, by 1.5 times.

Further, the behavior-link weighting unit 104 creates a new link based on a semantic relevance of each class. For example, provided that "view" that is a class into which a term included as a predicate in the behavioral meta data 3 and "record" that is a class into which a term included as a predicate in the behavioral meta data 4 are previously set to have a semantic relevance in the behavior ontology. In this case, the behavior-link weighting unit 104 creates, regarding that the class that is "view" and the class that is "record" are connected. An anteroposterior relation as a link can be determined arbitrarily or according to a predetermined method. In this case, for a node that is "record", the behavior-link weighting unit 104 creates a new link to a node that is "view". For the newly created link, the behavior-link weighting unit 104 can further set a weighting coefficient.

Figure 6:
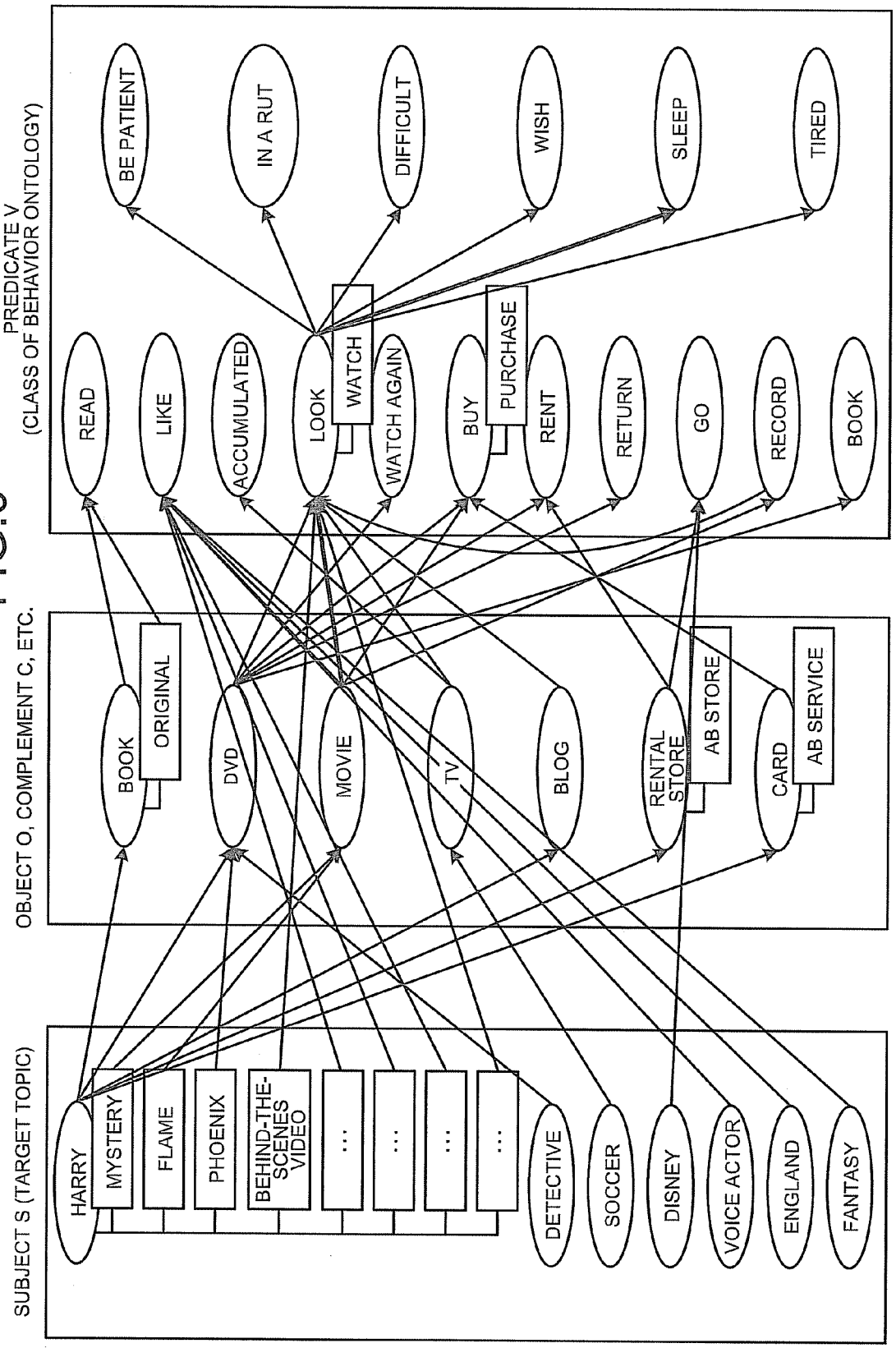
FIG. 6 is another conceptual diagram of a data structure of the behavior map data according to the embodiment.

The behavior-link weighting unit 104 stores in the behavior-map storage unit 103 the behavior map data updated by thus setting the weighting coefficient to the link or newly creating a link. FIG. 6 is a conceptual drawing of a data structure of the updated behavior map data. In FIG. 6, an arrow that connects a node that is "movie" and a node that is "view" is indicated bolder than other arrows, and the bolder arrow indicates that the weighting coefficient is set to the link between the nodes.

User information is inputted to the relevant-behavior selecting unit 105. The user information includes topic information indicating a topic of a webpage that the user is currently browsing, behavior information indicating a behavior that the user is currently doing (referred to as "current behavior"), position information indicating a current position, history information indicating a past history of these, profile information such as age and sex of the user. The position information can be acquired by a global positioning system (GPS), for example. The method of acquiring the behavior information including the position information, the profile information, and the history information is not limited. These pieces of information are obtained by an arbitrary method, and are inputted to the data creating apparatus 100 from the external device via the communication I/F, for example. When such user information is inputted, the relevant-behavior selecting unit 105 searches the behavior map data based on the user information, selects the behavior relevant to the current user behavior (relevant behavior) in the behavior map data obtained as a result of the search, and outputs information indicating this behavior as the relevant behavior information.

More specifically, the relevant-behavior selecting unit 105 firstly uses a topic, as a search key, indicated by the topic information included in the user information to search the behavior map data. In the behavior map data obtained as a result of the search, the relevant-behavior selecting unit 105 selects the behavior relevant to the current behavior (relevant behavior) based on the behavior information, the position information, the history information, or the profile information included in the user information. More specifically, for example, the relevant-behavior selecting unit 105 follows the link in the behavior map data to specify a node equivalent to a concept of the current behavior or a node corresponding to the current position, and out of the link for the specified node, selects the relevant behavior of the other node for the link to which a weighting coefficient that is equal to or more than a predetermined value. The method of following the link in the behavior map data is not particularly limited. The relevant-behavior selecting unit 105 outputs the relevant behavior information indicating the relevant behavior.

Figure 7:
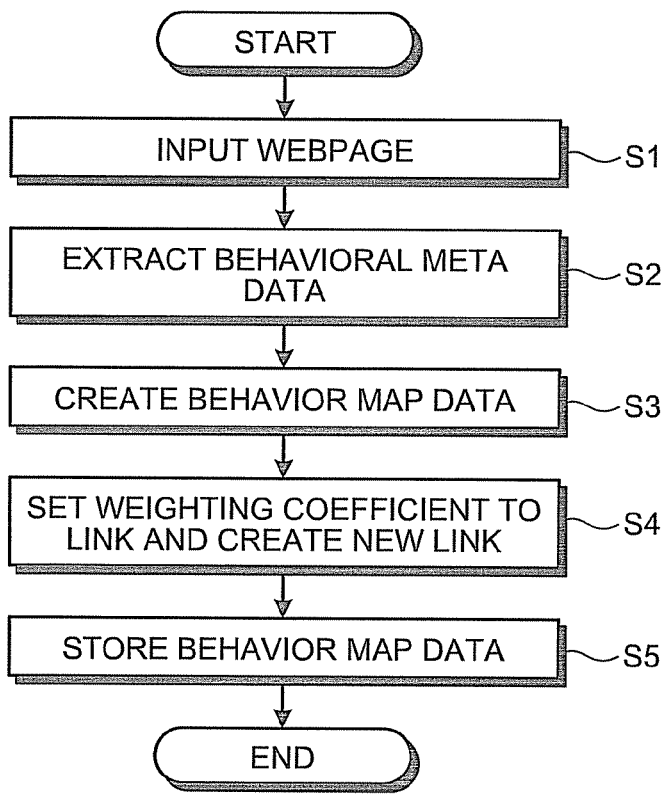
FIG. 7 is a flowchart of a behavior-map-data creating process procedure performed by the data creating apparatus.

A behavior-map-data creating process procedure performed by the data creating apparatus 100 according to the present embodiment is explained next with reference to FIG. 7. When a webpage collected for a certain topic is inputted to the data creating apparatus 100 (Step S1), the data creating apparatus 100 extracts the behavioral meta data from each webpage (Step S2). Subsequently, the data creating apparatus 100 refers to the behavior ontology and the product ontology to convert each term included in each behavioral meta data extracted at Step S2 into classes. The data creating apparatus 100 represents each of the classes as nodes, and also creates the behavior map data representing the modification relation among the classes as the link among the nodes for each topic (Step S3). The conceptual data structure of the behavior map data created in this case is as shown in FIG. 5. Thereafter, based on the number of times of appearance of two or more classes in the modification relation and the appearing order of the behavioral meta data with respect to the behavior map data created at Step S3, the data creating apparatus 100 sets the weighting coefficient to the link, and based on the semantic relevance of each class, creates a new link (Step S4). The data creating apparatus 100 stores the behavior map data updated by setting the link weighting coefficient at Step S4 or newly creating a link, into the behavior-map storage unit 103 (Step S5). The conceptual data structure of the behavior map data updated in this case is as shown in FIG. 6.

Figure 8:
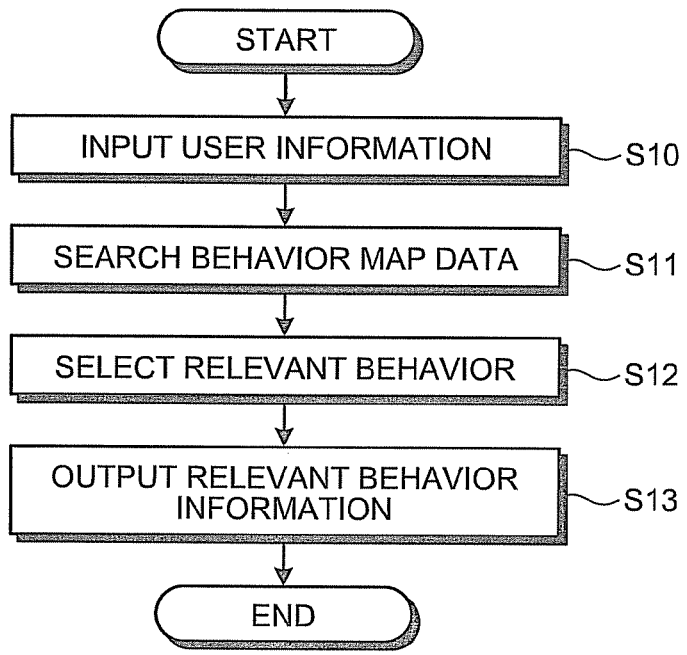
FIG. 8 is a flowchart of a process procedure of the data creating apparatus for outputting relevant behavior information using the behavior map data.

Next, a process procedure of the data creating apparatus 100 for outputting the relevant behavior information using the behavior map data stored in the behavior-map storage unit 103 is explained with reference to FIG. 8. When the user information is inputted in the data creating apparatus 100 (Step S10), the data creating apparatus 100 uses a topic indicated, as a search key, by the topic information included in the user information to search the behavior map data stored in the behavior-map storage unit 103 (Step S11). In the behavior map data obtained as a result of the search, the data creating apparatus 100 selects the behavior relevant to the current behavior (relevant behavior) based on the behavior information that is included in the user information and that is indicating the current behavior (Step S12). The data creating apparatus 100 outputs the relevant behavior information indicating the relevant behavior (Step S13).

Figure 9:
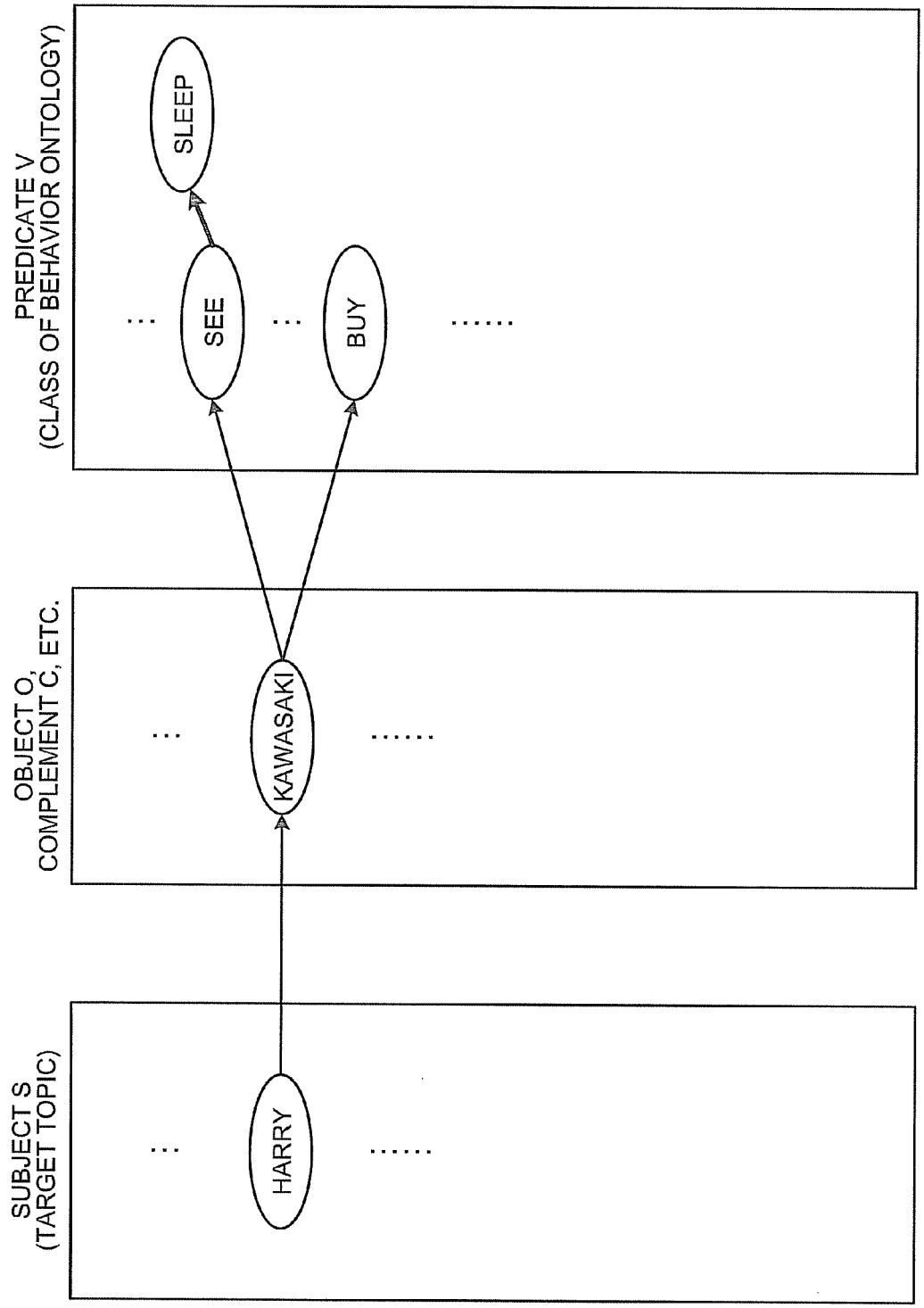
FIG. 9 is a schematic diagram for explaining a relevant behavior of the behavior map data according to the embodiment.

For example, provided that the topic indicated by the topic information is "Harry", the current behavior indicated by the behavior information is "view", and the current position indicated by the position information is "AB plaza". Also provided that "AB plaza" is equivalent to a class of "Kawasaki" in the geographic name ontology shown in FIG. 4. A class equivalent to the concept of "view" is "see". In this case, a node of "Kawasaki" is connected to the node of "Harry", and a node of "see" is connected to the node of "Kawasaki". In the behavior map data as shown in FIG. 9, for example, each node and the links among nodes can be specified. As shown in FIG. 9, provided that out of the link for the node of "see" this is specified in this case, there is a link for a node of "sleep". In this case, the data creating apparatus 100 selects the node of "sleep" as the relevant behavior. That is, for a user who is assumed to "see Harry at the AB plaza", the relevant behavior that is relevant thereto is selected. The data creating apparatus can select the node as the relevant behavioral only when the weighting coefficient set to the link is equal to or more than a predetermined value. The data creating apparatus 100 outputs a message of "are you about to sleep?", for example, as the relevant behavior information indicating the relevant behavior that is "sleep". The data creating apparatus 100 can output the relevant behavior information to an external device such as a mobile information terminal via the communication I/F, for example, and can output the same to a display device.

As described above, the data creating apparatus 100 can extract data with less noise by extracting the behavioral meta data from a plurality of webpages such as a CGM that includes a blog written not only by the user him or herself but also by an unspecific large number of users. When the data creating apparatus 100 uses this behavioral meta data to create the behavior map data, it becomes unnecessary to manually register a behavioral rule or the like. As a result, the cost required for configuring or maintaining a system can be reduced.

Further, when the product ontology or the behavior ontology is referred and the behavioral meta data is used, data that is converged into the same concept is grouped as a class, thereby creating the behavior map data. In this way, the behavior map data can be created without including information that can specify an individual or information that must be kept confidential, the security can be maintained, and the privacy can be protected. By thus creating the behavior map data, when the relevant behavior is selected based on an analogous topic, the relevant behavior information can be outputted even when there is no behavioral meta data corresponding to a target topic. Thereby, even when the target topic is a less popular subject, and thus, sufficient behavioral meta data cannot be obtained from the webpage, some form of relevant behavior can be presented to the user.

As long as the weighting coefficient is set to the link in the behavior map data, when the link is followed or the weighing coefficient of the link is taken into consideration, a regular behavior or the relevant behavior can be easily detected. Accordingly, a behavior that is probably desirably taken by the user can be effectively selected and presented.

When the weighing coefficient is set to a link that represents a connection among behaviors expressed as a class, as the behavioral regularity in the sentence written on the webpage, in view of the appearing order of the behavioral meta data extracted from the sentence, a behavior that is useful but often occurring and an unexpected behavior can be distinguished. Thus, when the former behavior is presented to the user, the practicality can be presented to the user, and also, when the latter behavior is presented to the user, the amusement can be presented to the user.

That is, in the present embodiment, the node of which the weighting coefficient set to the link is equal to or more than a predetermined value is selected as the relevant behavior. In contrary thereto, a node of which the weighting coefficient set to the link is smaller than a predetermined value, i.e., a behavior that has weak relevance, can also be selected. When information indicating this behavior, it becomes possible to present a behavior that the user feels a little surprising.

The presentation of the unexpected behavior not based on a user individual can also be realized by extracting the behavioral meta data from the webpage such as a blog written not only by the user him or herself but also by an unspecific large number of users.

The present invention is not limited to the above embodiment as it is, and can be embodied by modifying constituent elements without departing from the scope of the invention. Furthermore, various inventions can be created by combinations of the constituent elements disclosed in the above embodiment. For example, some of the whole constituent elements disclosed in the embodiment can be omitted. Further, the constituent elements according to different embodiments can be suitably combined with each other. In addition, various modifications such as the following example can be made.

In the above embodiment, various programs executed by the data creating apparatus 100 can be stored in a computer connected to a network such as the Internet, downloaded through the network, and provided. Alternatively, these programs can be recorded in a computer-readable recording medium such as a CD-ROM, a flexible disk (FD), a CD recordable (CD-R), or a digital versatile disk (DVD) as a file of an installable format or an executable format and provided.

In the above embodiment, the method for collecting webpages and the method for extracting behavioral meta data are not particularly limited.

In the above embodiment, the topic can be plural, and the behavioral meta data can be extracted or the behavior map can be created for each set of plural topics.

In the above embodiment, the behavior ontology and the product ontology are not limited to those described above. An ontology in which concepts of linguistic expressions about other various items are classes, and a corresponding relation among the classes is expressed by a graph can be used to create the behavior map data.

In the above embodiment, the behavior-link weighting unit 104 can further set the weighting coefficient to a newly created link.

In the above embodiment, the relevant behavior information outputted by the data creating apparatus 100 at Step S13 can not only be information that indicates the relevant behavior itself but also be information that is relevant to the relevant behavior, for example. The data creating apparatus 100 can output information relating to a "soothing" product or a "sleep well" product, as the information relevant to the relevant behavior of "sleep" in the example described above, and this information can be connected to the external device or information providing site that provides as a webpage via a network, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data creating apparatus comprising:
   an extracting unit that extracts behavioral meta data about a topic from a document, the behavioral meta data including at least one linguistic expression about a behavior, a plurality of the linguistic expressions having a first modification relation;
   a converting unit that converts each of the linguistic expressions into each of classes, based on a behavior ontology that is expressed by a graph where the linguistic expression about the behavior is set as an instance and a concept of the instance is set as the class; and
   a data creating unit that creates behavior map data representing each of the classes converted by the converting unit and also representing a second modification relation among the classes as a link.

2. The apparatus according to claim 1, further comprising a setting unit that sets a weighting coefficient to the link, based on at least one of an appearing frequency of the second modification relation and an appearing order of the behavioral meta data extracted from the document.

3. The apparatus according to claim 1, further comprising a link creating unit that creates a new link between the class represented in the behavior map data and another class approximated to the class.

4. The apparatus according to claim 3, further comprising a new setting unit that sets a weighting coefficient to the new link.

5. The apparatus according to claim 1, further comprising a storage unit that stores the behavior map data.

6. The apparatus according to claim 5, further comprising:
   an acquiring unit that acquires topic information indicating a target topic and behavior information indicating a current user behavior;
   a searching unit that searches the behavior map data corresponding to a topic indicated by the topic information in the storage unit and obtains relevant behavior map data;
   a selecting unit that selects a relevant behavior relevant to the current user behavior, based on the link for a first class equivalent to a concept of the behavior indicated by the behavior information, in the behavior map data obtained as a result of the search; and
   an output unit that outputs relevant behavior information indicating the relevant behavior.

7. The apparatus according to claim 6, wherein the selecting unit selects, as the relevant behavior, an alternate class having the link between the first class in the behavior map data.

8. The apparatus according to claim 6, wherein the selecting unit selects, as the relevant behavior, an alternate class for a link to which a weighting coefficient equal to or more than a first predetermined value is set, from the link for the first class.

9. The apparatus according to claim 6, wherein the selecting unit selects, as the relevant behavior, an alternate class for a link to which a weighting coefficient equal to or less than a second predetermined value is set, from the link for the first class.

10. A data creating method implemented in a data creating apparatus, the method comprising:
    extracting behavioral meta data about a topic from a document, the behavioral meta data including at least one linguistic expression about a behavior, a plurality of the linguistic expressions having a first modification relation;
    converting each of the linguistic expressions into each of classes, based on a behavior ontology that is expressed by a graph where the linguistic expression about the behavior is set as an instance and a concept of the instance is set as the class; and
    creating behavior map data representing each of the converted classes and also representing a second modification relation among the classes as a link.

* * * * *